(12) United States Patent
Sharifi et al.

(10) Patent No.: US 9,129,015 B1
(45) Date of Patent: Sep. 8, 2015

(54) MIN/MAX FILTER FOR AUDIO MATCHING

(75) Inventors: Matthew Sharifi, Zurich (CH); Dominik Roblek, Ruschlikon (CH)

(73) Assignee: Google Inc., Mountain View, CA (US)

( * ) Notice: Subject to any disclaimer, the term of this patent is extended or adjusted under 35 U.S.C. 154(b) by 566 days.

(21) Appl. No.: 13/533,838

(22) Filed: Jun. 26, 2012

(51) Int. Cl.
*G06F 17/00* (2006.01)
*G06F 17/30* (2006.01)
*G06K 9/00* (2006.01)

(52) U.S. Cl.
CPC ...... *G06F 17/30743* (2013.01); *G06K 9/00536* (2013.01)

(58) Field of Classification Search
CPC ............... G06F 17/30743; G06K 9/00536
USPC ............................................. 700/94
See application file for complete search history.

(56) References Cited

U.S. PATENT DOCUMENTS

| 7,333,864 | B1 * | 2/2008 | Herley ........................... 700/94 |
| 2005/0091275 | A1 * | 4/2005 | Burges et al. ............... 707/104.1 |
| 2009/0265174 | A9 * | 10/2009 | Wang et al. .................. 704/273 |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

* cited by examiner

*Primary Examiner* — Joseph Saunders, Jr.
(74) *Attorney, Agent, or Firm* — Amin, Turocy & Watson, LLP (57) ABSTRACT

Systems and methods are provided herein relating to audio matching. Descriptors can be generated for a received audio signal and matched with reference descriptors. Potential matching reference samples can then be filtered based on, at least in part, a number of hits, a match threshold, and a window size. As more hits are accumulated for a reference sample, the more likely the reference sample is to pass through the filter. Eliminating potential false positive matches before performing more computational demanding matching algorithms can increase efficiency within an audio matching system.

17 Claims, 10 Drawing Sheets

MIN/MAX FILTER FOR AUDIO MATCHING

TECHNICAL FIELD

This application relates to audio matching, and more particularly to using a min/max filter for efficient pruning of potential audio matches at large scale.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine the identity of the audio sample.

In a typical large scale descriptor audio matching system, a set of reference samples can number in the millions or tens of millions. When comparing descriptors of an audio sample with descriptors of millions of reference samples, there can be many reference candidates that contain one or more "hits" (e.g., a shared descriptor at a particular time in the audio sample and the reference candidate) between the audio sample descriptor(s) and reference sample descriptors. One of the reference candidates containing one or more hits is likely a true positive match; however other reference candidates containing hits are likely not and many or all should be discarded as false positives.

Typically, a match is determined between a probe sample and a specific reference sample by examining the hits which are in common between descriptors of the probe sample and the descriptors of the specific reference sample. Each hit can be associated with a time in the probe sample and a time in the reference sample. As hits indicate a match at a particular point in time, additional hits can be aggregated over time by looking along a projection of hits. Generating a projection of hits for each potential match, e.g., any reference descriptor containing a hit, in a large scale matching system can be computationally expensive; thus, there exists a need to filter out as many false positive matches as possible prior to generating a projection of hits for potential matches.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

An input component can receive an audio sample. A descriptor component can generate a set of descriptors based on the audio sample. A matching component can dynamically generate a first set of hits for respective reference samples among a set of reference samples based on comparing the set of descriptors to a set of reference descriptors associated with reference samples among the set of reference samples. In one implementation, comparing the set of descriptors to a set of reference descriptors can be performed using an inverted index.

A first filter component can dynamically generate a filtered set of reference samples based on a number of hits associated with the set of hits for a reference sample among the set of reference samples and a match threshold. A second filter component that upon the number of hits of reference samples among the filtered set of reference samples satisfying a threshold-match criteria, can generate a min/max value and associates it with the reference sample, wherein if the min/max value satisfies criteria relating to a window size, the reference sample is removed from the filtered set of reference samples and added to a set of potential matches.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using the short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect scalability of an audio matching system. Therefore, it can be desirable to instead calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

In a typical large scale descriptor audio matching system, a set of reference samples can number in the millions or tens of millions. When comparing descriptors of an audio sample with descriptors of millions of reference samples, there can be many "hits" or potential matches between the audio sample descriptor(s) and reference sample descriptors. For example, in response to a lookup of a short, fifteen second audio sample against an index of over ten million references, there could be as many as five to ten million hits associated with some five million reference samples. One of these references is likely the true positive, but the rest of the reference samples are not, and many or all should be discarded as false positives.

Typically, a match is determined between a probe sample and a specific reference sample by examining the hits which are in common between descriptors of the probe sample and the descriptors of the specific reference sample. Each hit can be associated with a time in the probe sample and a time in the reference sample. As hits indicate a match at a particular point in time, additional hits can be aggregated over time by looking along a projection of hits. Generating a projection of hits for each potential match, e.g., any reference descriptor containing a hit, in a large scale matching system can be computationally expensive because it may have to be done for millions of potential matching reference samples. Thus, there exists a need to filter out as many false positive matches as possible prior to generating a projection of hits for potential matches.

Systems and methods herein provide for filtering false positives prior to generating a projection of hits for potential matches. First, a set of descriptors can be generated based on a received audio sample. The set of descriptors can then be matched to a set of reference descriptors associated with reference samples. A min/max filter with a series of stages can then be applied to those reference samples with descriptors that match descriptors of the received audio sample to eliminate at least some of the potential false positive matches. Once a reference sample passes through the filter, it is less likely to be a false positive match, and the reference sample can be considered for a closer inspection, such as, by generating a histogram of projections associated with the reference sample and the audio sample that is desired to be matched.

Figure 1:
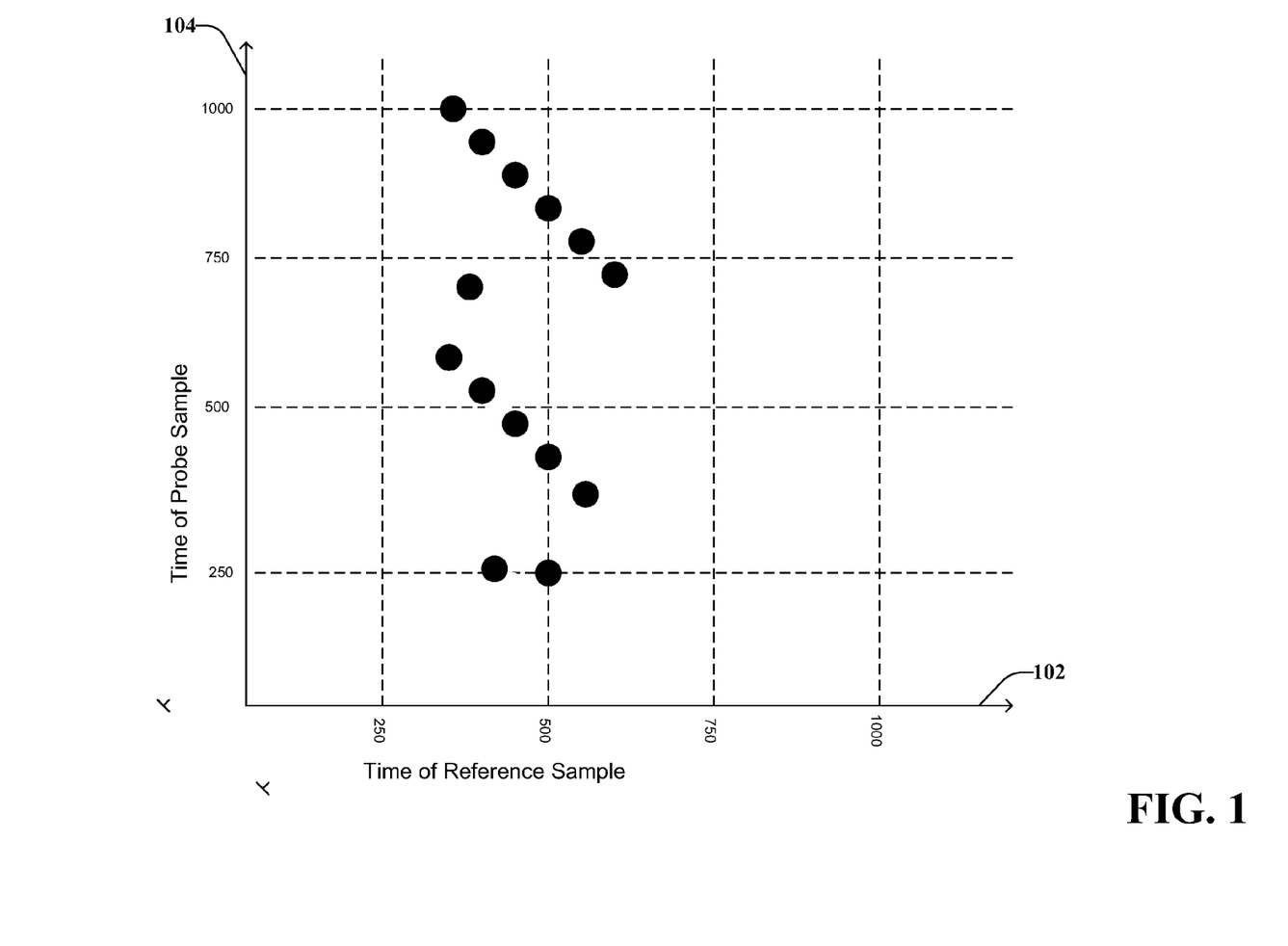
FIG. 1 illustrates an example plot of hits between a probe sample and a reference sample in accordance with implementations of this disclosure.

Referring now to FIG. 1, there is illustrated an example plot of hits between a probe sample and a reference sample in accordance with implementations of this disclosure. Each point on the plot corresponds to a hit between a descriptor of the probe sample and a descriptor of the reference sample. The vertical axis 104 or y axis plots the time in the probe sample of the hit. The horizontal axis 102 or x axis plots the time of the reference sample of the hit. It can be appreciated, that the probe sample can be, for example, a ten or fifteen second sample of audio at any point in time. A fifteen second sample could be the last fifteen seconds of a reference, the first fifteen seconds of a reference sample, or any fifteen second period within the reference sample. Thus, a matching reference sample hit and a probe sample hit may not, and most likely will not, match at the same point in time in each respective sample. However, a series of hits between a probe sample and a matching reference sample should be temporally aligned, that is, the difference in time between a probe sample hit and a reference sample hit should remain relatively constant if the two are match.

The difference in time need not be identical, as a probe sample suffering from time stretching can slightly alter the difference in time between a probe sample hit and a reference sample hit over time. As each point on the plot corresponds to both a probe sample time and a reference sample time, the value (x−y) can be used to calculate the time difference for each point. It can be appreciated that (y−x) can also be used, but for ease of explanation, the example used going forward will be (x−y). For a probe sample and a matching reference sample, the value of (x−y) should remain relatively constant for each hit, and can be identified in FIG. 1 by a string of diagonally aligned hits on the plot.

The min/max filter can use two parameters to adjust the sensitivity of the filter in assessing whether the reference sample should be filtered out as a false positive or retained as a potential match. The first parameter is a match threshold ("T"). The match threshold is the number of hits required before considering the reference sample to be a potential match. It can be appreciated that T can be determined through experimentation, and optimization. One example of T would be 4. The second parameter is a window size ("W") that in part, defines the maximum possible time shift over the probe sample. For example, if the probe sample is fifteen second long, and it is desired to have the system handle a 5% relative speed change, then W should be set to 15*0.05 which equals 0.75 seconds. Using this example, the window size can prevent a potential match from being dropped if there are at least T index hits where the probe sample is up to five percent faster or slower than the reference sample.

The first stage of the filter, in accordance with implementations of the subject disclosure, first measures a number of hits between a reference sample and the probe sample. For example, FIG. 1 denotes fourteen hits between the probe sample and the reference sample, as denoted by each point on the plot. If there are fewer than T hits between the probe sample and the reference sample, the reference sample does not pass the first stage of the filter. As hits are aggregated, the reference sample can be reevaluated such that once the number of hits equals T; the reference sample can pass the first stage of the filter.

A second stage of the filter, upon the number of hits between the probe sample and reference sample meeting the match threshold, can generate a min/max value associated with all the known hits. For example, (x−y) can be calculated for each hit between the probe sample and the reference sample. The minimum value of (x−y) can be stored as "MIN". The maximum value of (x−y) can be stored as "MAX". If MAX minus MIN is less than or equal to W, the reference sample can pass through the second stage of the filter. If MAX minus MIN is greater than W, it is impossible for the reference sample to be a match under the speed change constraints imposed by the window size parameter and the reference sample will not pass through the second stage of the filter.

A third stage of the filter, upon the number of hits between the probe sample and the reference sample exceeding the match threshold, can compare the new hit to the previously generated MIN and MAX values, and other previous hits that exceeded the match threshold. For example, if T is 20 and the third stage of the filter is evaluating the $22^{nd}$ hit, then it would compare the $22^{nd}$ hit against MIN, MAX, and hit 21. For example, the comparison can be made by calculating the following:

$$\min(\text{abs}(\text{new\_hit}-\text{MIN}),\text{abs}(\text{new\_hit}-\text{MAX}),\text{abs}(\text{new\_hit}-\text{hit}\_N))<=W$$

where "hit_N" is all (x−y) values from T+1 to the total number of hits, and where "new_hit" is also computed as (x−y) for the new hit. If the min value for this expression is less than or equal to W, then the reference can pass the third stage of the filter and it might be a match. If the min value for this expression is greater than W, then the reference sample is still not yet a match. It can be appreciated that as more hits are accumulates; it becomes increasingly likely of passing the third stage of the filter. It can be appreciated that because a reference sample will proceed through the stages of the filter as hits are accumulated, that the systems and methods disclosed herein are well suited to a matching streams where the system gradually receives a probe sample and matches it against the reference database as it's received.

Figure 2:
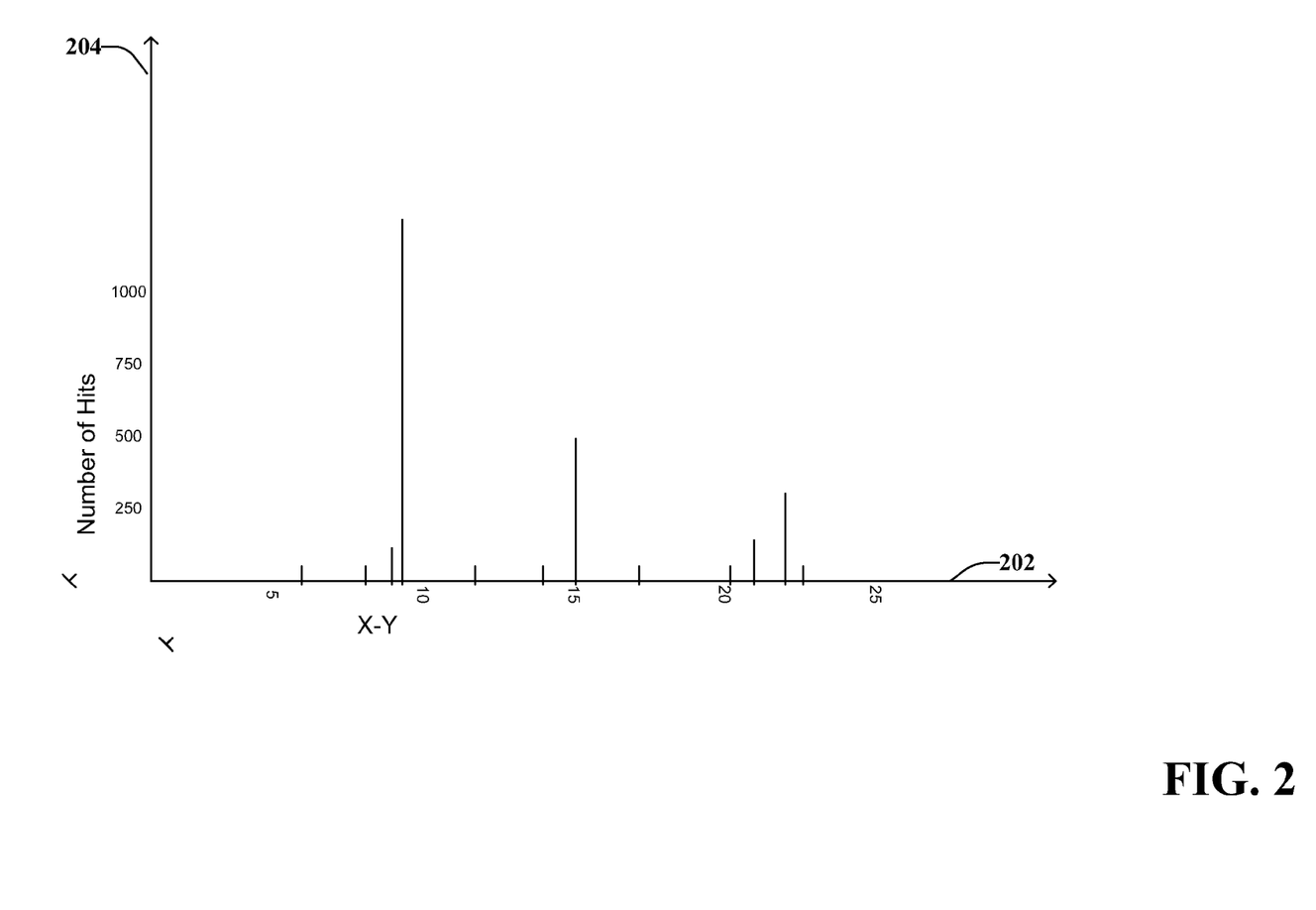
FIG. 2 illustrates an example histogram aggregating hits between a probe sample and a reference sample in accordance with implementations of this disclosure.

Once a reference sample passes through the three stage filter as a potential match to a probe sample, a closer inspection can be made between the probe sample and the reference sample. Referring now to FIG. 2, there is illustrated an example histogram aggregating hits between a probe sample and a reference sample in accordance with implementations of this disclosure. Generating and analyzing a histogram can be one method of making the closer inspection with regards to the probe sample and a potential matching reference sample. The vertical axis 204 or Y axis plots the time number of hits. The horizontal axis 102 or X axis plots (x−y) values of hits as described with regard to FIG. 1. Evidence of sharp peaks on the histogram can denote common (x−y) values shared by a number of hits. Thus, the sharper, i.e., the higher a single peak is in the histogram, the more likely the reference sample is a match. It can be appreciated that histograms can be analyzed for a variety of features indicative of a match beyond which histogram has the sharpest peak. It can be further appreciated that generating a histogram for every potential match can become computationally expensive; thus, eliminating false positives prior to generating a histogram can provide more efficient audio matching.

Figure 3:
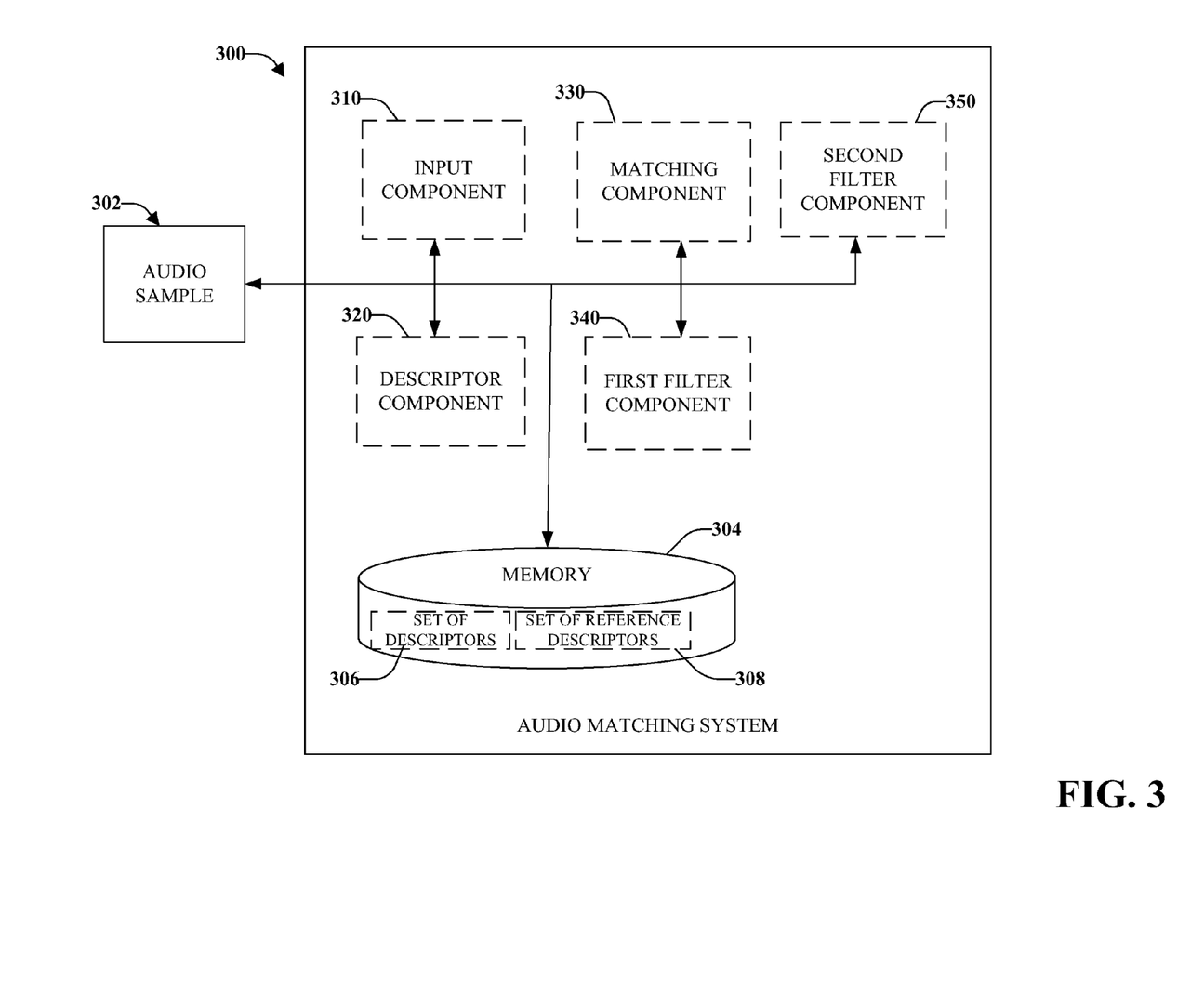
FIG. 3 illustrates a high-level functional block diagram of an example audio matching system in accordance with implementations of this disclosure.

Referring now to FIG. 3, there is illustrated a high-level functional block diagram of an example audio matching system in accordance with implementations of this disclosure. In FIG. 3, an audio matching system 300 includes an input component 310, a descriptor component 320, a matching component 330, a first filter component 340, a second filter component 350, and a memory 304, each of which may be coupled as illustrated. An input component 310 can receive an audio sample.

Descriptor component 320 can generate a set of descriptors 306 based on the audio sample. The set of descriptors 306 can be stored within memory 304 for access by any components. In one implementation, input component 310 can receive the audio sample from a client device incrementally and the descriptor component can dynamically generate the set of descriptors in response to the incremental reception. For example, input component 310 can receive the audio sample from a client device via a stream, where the audio sample is incrementally received and descriptors are dynamically generated during the incremental reception. Matching component 330 can dynamically generate a first set of hits for respective reference samples among a set of reference samples based on comparing the set of descriptors 306 to a set of reference descriptors 308 associated with reference samples among the set of reference samples. The set of reference descriptors 308 can be stored within memory 304 for access by any components. It can be appreciated that matching component 330 can dynamically generate hits in response to descriptor component 320 dynamically generating the set of descriptors in response to incremental reception of the audio sample by input component 310.

A first filter component 340 can dynamically generate a filtered set of reference samples based on a number of hits associated with the first set of hits for a reference sample among the set of reference samples and a match threshold. For example, if the match threshold is ten, then the number of hits associated with a reference sample must reach ten before the reference sample is added to the filtered set of reference samples. Those reference samples that have a number of hits less than the match threshold can be filtered. It can be appreciated that as matching component 330 dynamically generates the first set of hits for a respective reference sample, first filter component 340 can reevaluate the number of hits associated with reference such that when the number of hits reaches the match threshold, the reference sample is added to the filtered set of reference samples.

A second filter component 350 can, upon the number of hits of reference samples among the filtered set of reference samples satisfying a threshold-match criteria, generate a min/max value and associate it with the reference sample, wherein if the min/max value satisfies criteria relating to a window size, the reference sample is removed from the filtered set of reference samples and added to a set of potential matches. In one implementation, min/max value is generated based on comparing a descriptor hit time and reference descriptor hit time for respective hits in the set of hits. For example, for each hit, the difference in time between the descriptor hit time and the reference descriptor hit time can be determined, e.g., (x−y) as more fully described with regards to FIG. 1. Once (x−y) is determined for each hit, the minimum (x−y) value can be deemed the MIN; the maximum (x−y) value can be deemed the MAX. In one example, the min/max value can be determined by subtracting the MIN from the MAX, e.g., (MAX−MIN). In one implementation, if the min/max value for a reference sample is less than or equal to the window size, then the reference sample can be added to a set of potential matches.

In one implementation, the window size is based on the length of the audio sample and a time stretch sensitivity. For example, if the length of the audio sample is fifteen seconds, and the time stretch sensitivity accounts for a five percent time stretch, then the window size can be set to 15*0.05 or 0.75 seconds.

Figure 4:
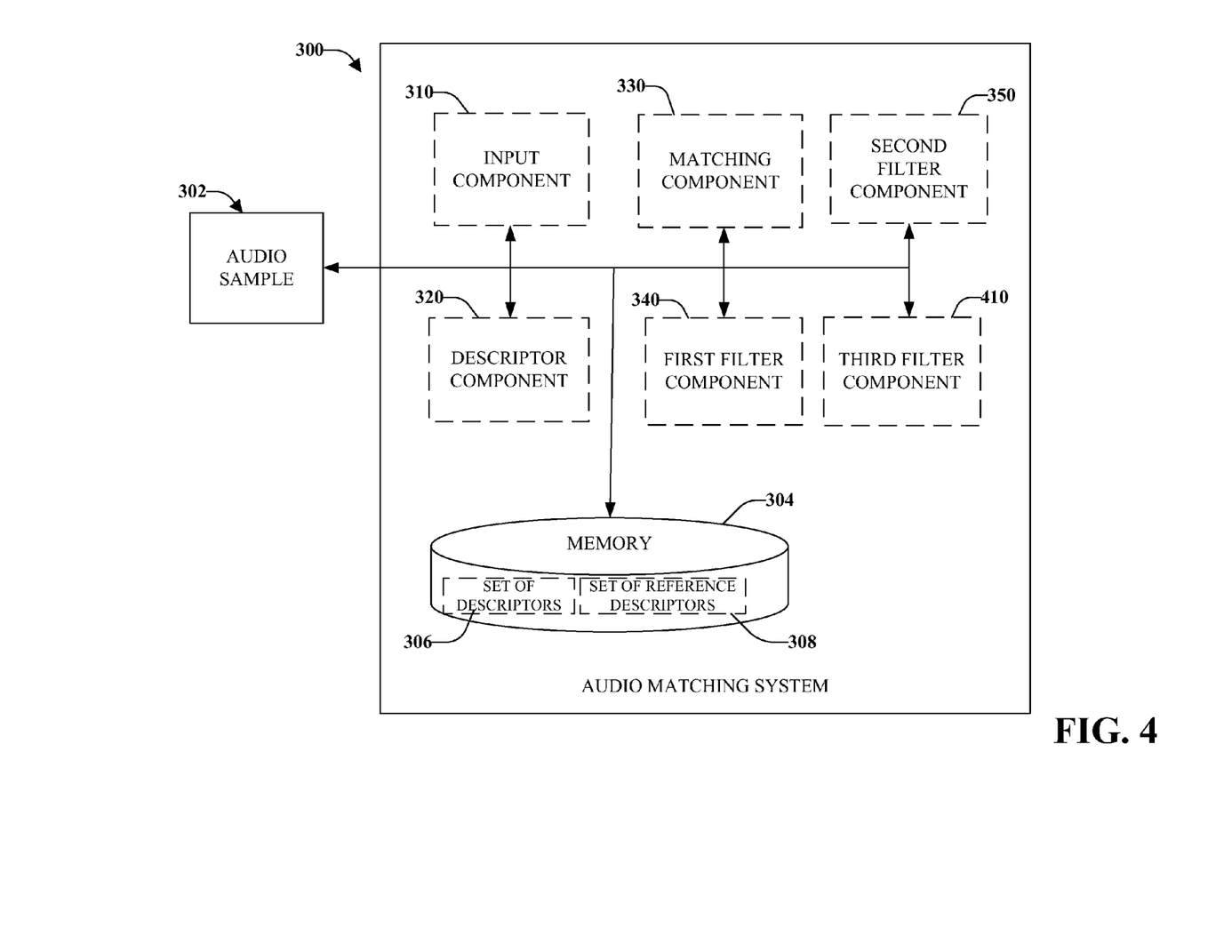
FIG. 4 illustrates a high-level functional block diagram of an example audio matching system including a third filter component in accordance with implementations of this disclosure.

Referring now to FIG. 4, there is illustrated a high-level functional block diagram of an example audio matching system including a third filter component 410 in accordance with implementations of this disclosure. Third filter component 410 can, upon the number of hits of respective reference samples among the filtered set of reference samples exceeding the threshold-match criteria, dynamically associate hits in excess of the match threshold as a second set of hits for respective reference samples. For example, if the threshold-match criteria is ten, then matching component 330 can dynamically generate a first set of hits including hits one through ten. Upon the number of hits satisfying the threshold-match criteria, additional hits generated by matching component 330 can be further associated with a second set of hits by third filter component 410. It can be appreciated that a hit can be associated with both the set of hits by matching component 330 and the second set of hits by third filter component 410.

In one implementation, third filter component 410 can further remove respective reference samples from the filtered set of reference samples, and add them to the set of potential matches based on comparing the min/max value and the second set of hits associated with respective reference samples. For example, the min/max value is established based on a first set of hits, e.g., those hits up to the match threshold. The second set of hits can then be compared to the min/max value.

In one implementation, third filter component 410 can compare the min/max value associated with respective reference samples with the second set of hits by comparing the min/max value for the respective reference sample with a descriptor hit time and a reference descriptor hit time for respective hits in the second set of hits, and the window size. For example, the comparison can be made by calculating the following: min(abs(new_hit−MIN), abs(new_hit−MAX), abs(new_hit−hit_N))<=Window Size as more fully described with respect to FIG. 1. If the calculation is less than or equal to the window size, then the reference can be added to the set of potential matches.

Figure 5:
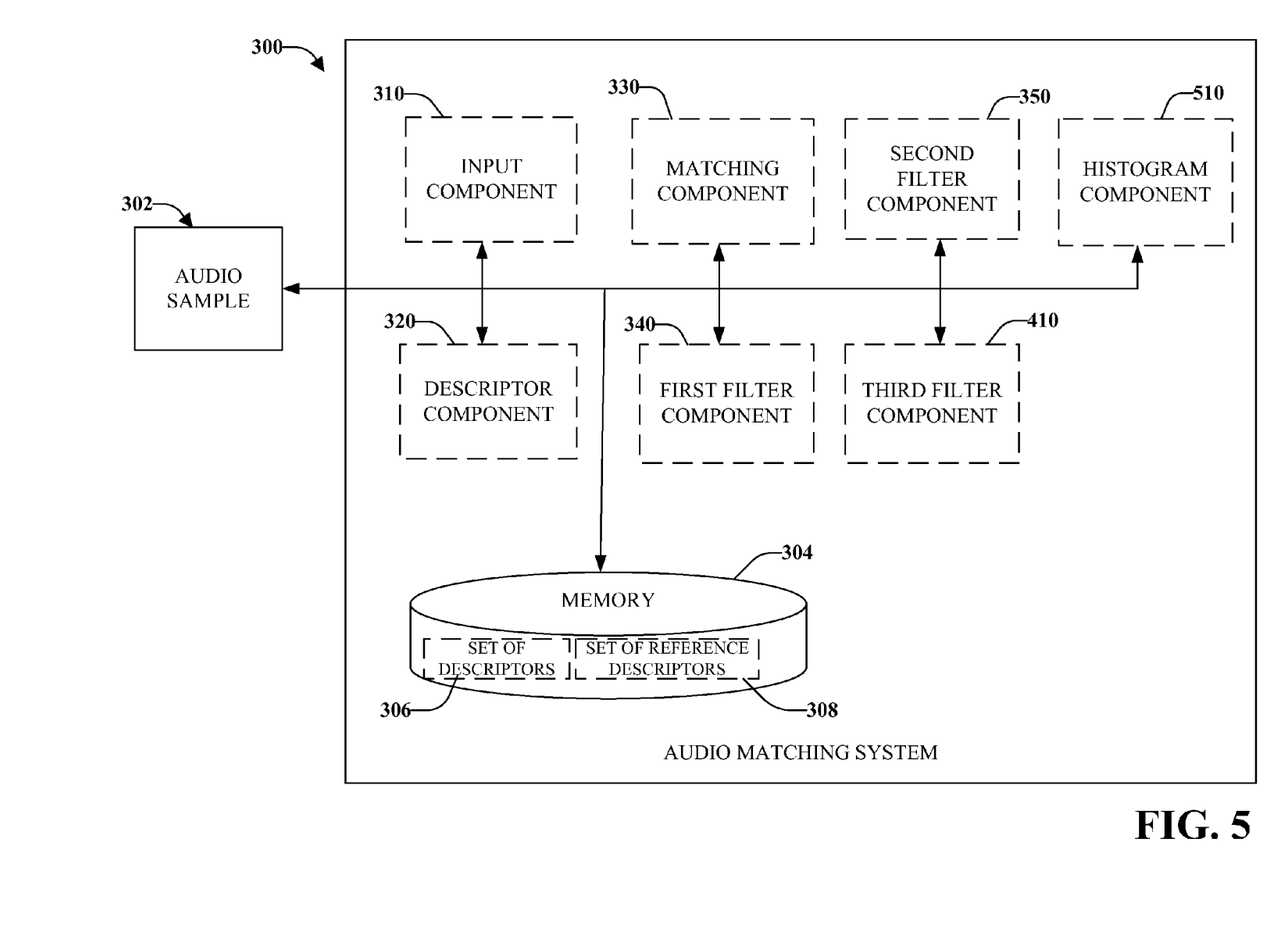
FIG. 5 illustrates a high-level functional block diagram of an example audio matching system including a histogram component in accordance with implementations of this disclosure.

Referring now to FIG. 5, there is illustrated a high-level functional block diagram of an example audio matching system including a histogram component 510 in accordance with implementations of this disclosure. Histogram component 510 can generate a histogram for respective potential matches in the set of potential matches based on the set of hits for respective potential matches, and the window size. In one implementation, histogram component 510 can further analyze a set of histograms to identify the most likely matching histogram among the set of histograms.

Figure 6:
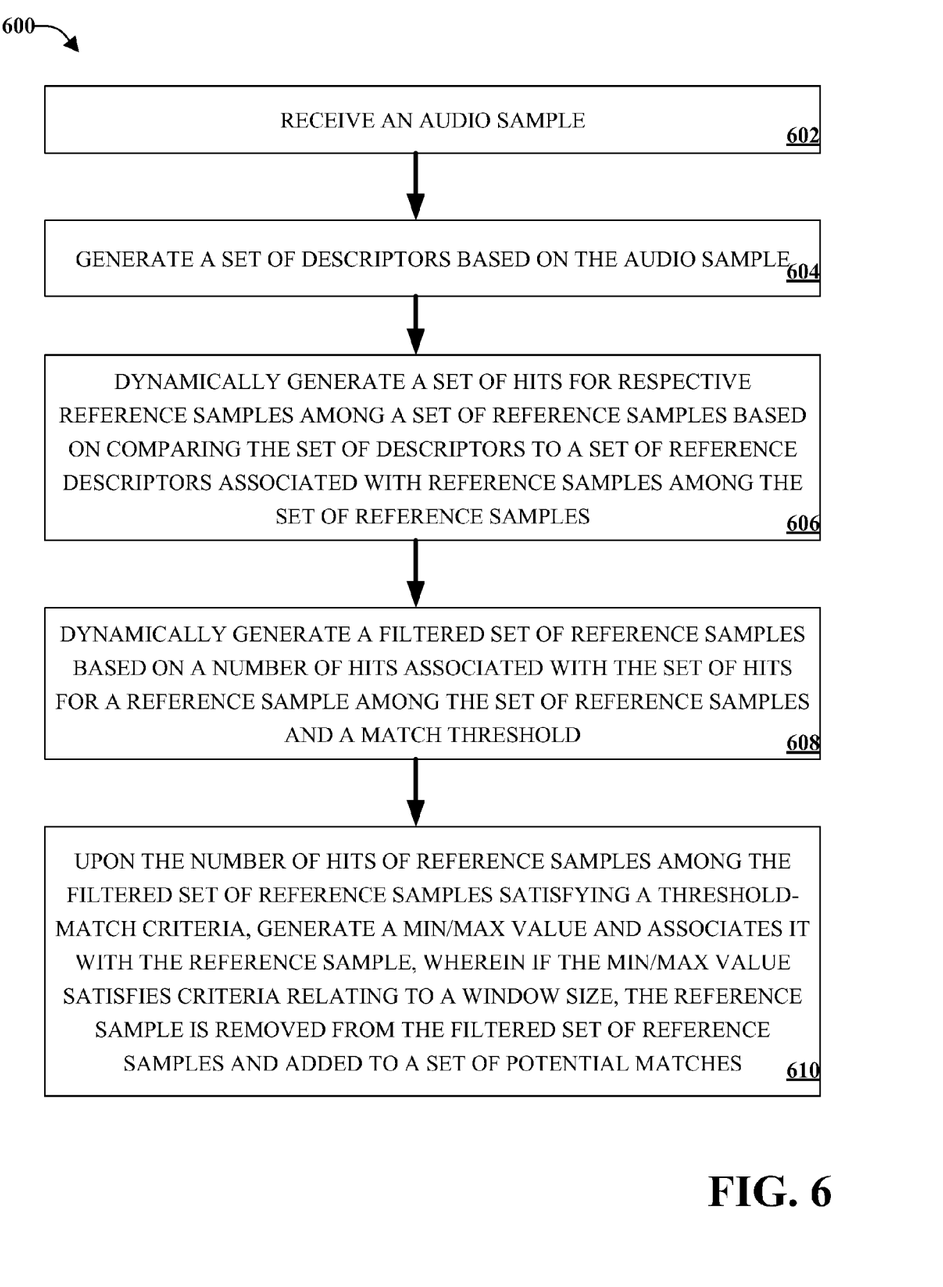
FIG. 6 illustrates an example method for audio matching in accordance with implementations of this disclosure.
Figure 7:
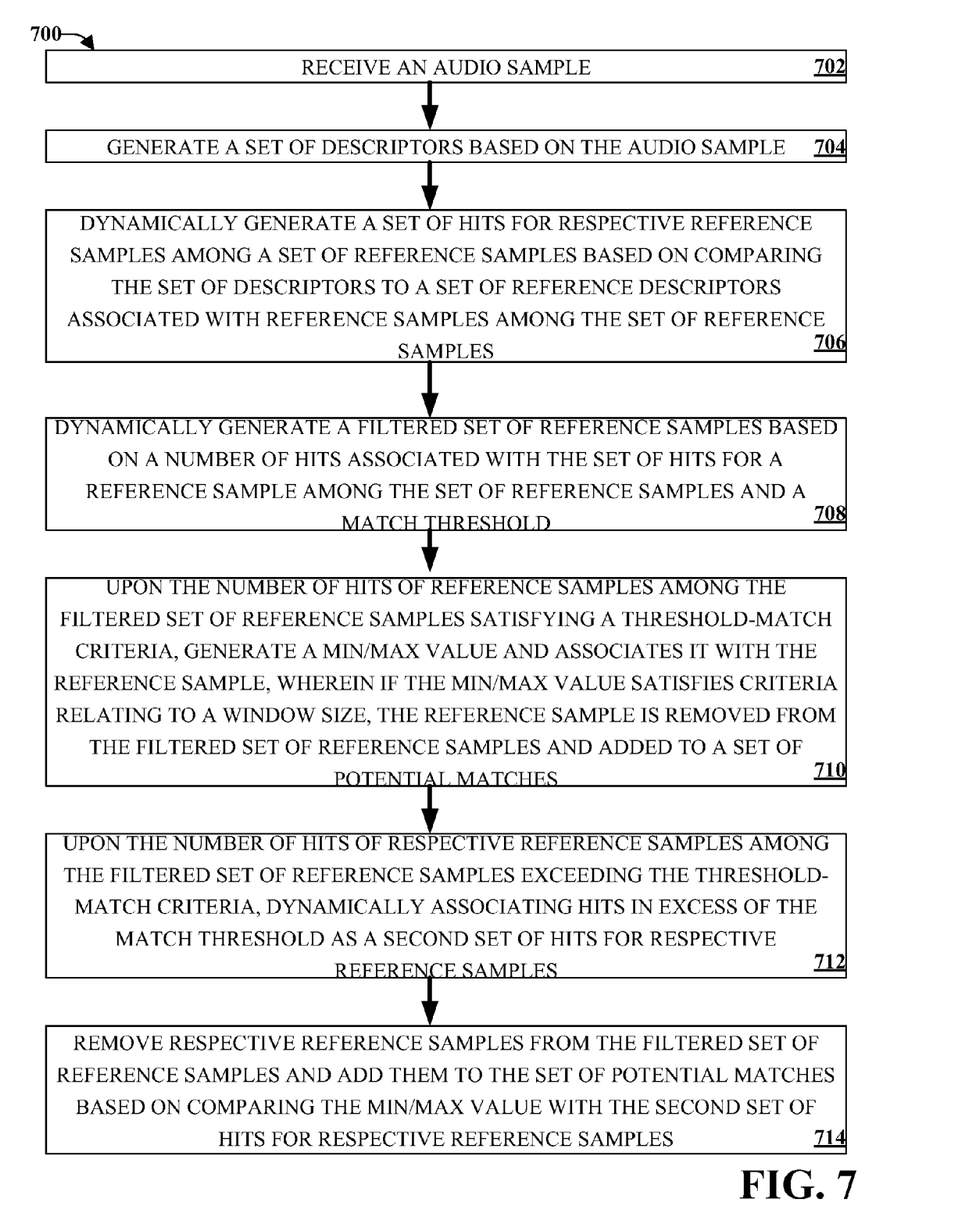
FIG. 7 illustrates an example method for audio matching including a third filter in accordance with implementations of this disclosure.
Figure 8:
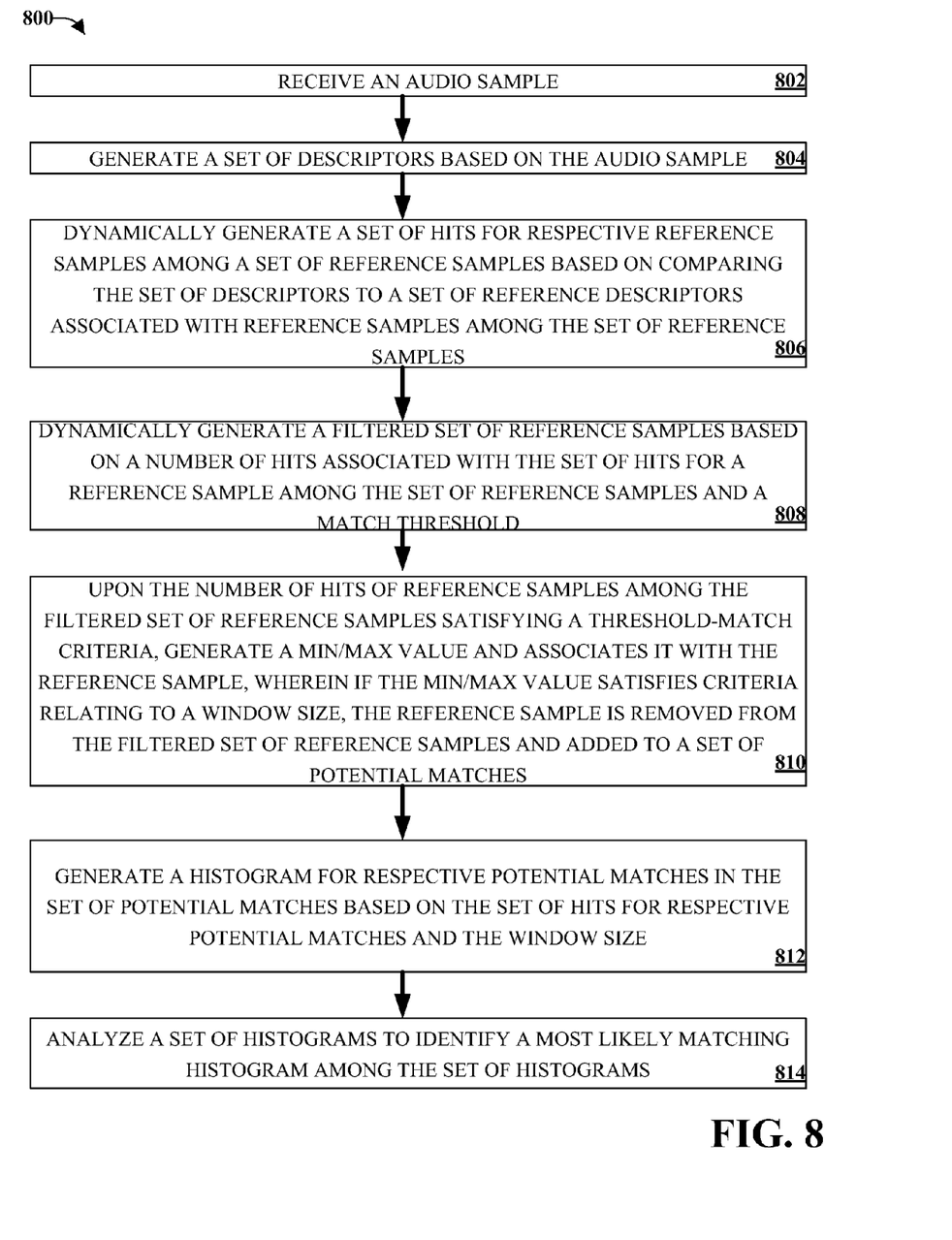
FIG. 8 illustrates an example method for audio matching including generating a histogram in accordance with implementations of this disclosure.

FIGS. 6-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring now to FIG. 6, there is illustrated an example method for audio matching in accordance with implementations of this disclosure. At 602, an audio sample can be received (e.g., by an input component 310). At 604, a set of descriptors can be generated (e.g., by a descriptor component 320) based on the audio sample. In one implementation, the receiving the audio sample is incremental and in response to the incremental reception, the generating the set of descriptors is dynamic. For example, the audio sample can be received from a client device via a stream and as the stream is incrementally received, descriptors can be dynamically generated. At 606, a set of hits for respective reference samples among a set of reference samples can be dynamically generated (e.g., by a matching component 330) based on comparing the set of descriptors to a set of reference descriptors associated with reference samples among the set of reference samples.

At 608, a filtered set of reference samples can be dynamically generated (e.g., by a first filter component 340) based on a number of hits associated with the set of hits for a reference sample among the set of reference samples and a match threshold. At 610, upon the number of hits of reference samples among the filtered set of reference samples satisfying a threshold-match criteria, a min max value can be generated (e.g., by a second filter component 350) and associated with the reference sample, wherein if the min/max value satisfies criteria relating to a window size, the reference sample is removed from the filtered set of reference samples and added to a set of potential matches.

Referring now to FIG. 7, there is illustrated an example method for audio matching including a third filter in accordance with implementations of this disclosure. At 702, an audio sample can be received (e.g., by an input component 310). At 704, a set of descriptors can be generated (e.g., by a descriptor component 320) based on the audio sample. At 706, a set of hits for respective reference samples among a set of reference samples can be generated (e.g., by a matching component 330) based on comparing the set of descriptors to a set of reference descriptors associated with reference samples among the set of reference samples.

At 708, a filtered set of reference samples can be dynamically generated (e.g., by a first filter component 340) based on a number of hits associated with the set of hits for a reference sample among the set of reference samples and a match threshold. At 710, upon the number of hits of reference samples among the filtered set of reference samples satisfying a threshold-match criteria, a min max value can be generated (e.g., by a second filter component 350) and associated with the reference sample, wherein if the min/max value is less than or equal to a window size, the reference sample is removed from the filtered set of reference samples and added to a set of potential matches.

At 712, upon the number of hits of respective reference samples among the filtered set of reference samples exceeding the threshold-match criteria, hits in excess of the match threshold can be dynamically associated (e.g., by a third filter component 410) as a second set of hits for respective reference samples. At 714, respective reference samples from the filtered set of reference samples can be removed and added (e.g., by a third filter component) to the set of potential matches based on comparing the min/max value with the second set of hits for respective reference samples.

Referring now to FIG. 8, there is illustrated an example method for audio matching including generating a histogram in accordance with implementations of this disclosure. At 802, an audio sample can be received (e.g., by an input component 310). At 804, a set of descriptors can be generated (e.g., by a descriptor component 320) based on the audio sample. At 806, a set of hits for respective reference samples among a set of reference samples can be generated (e.g., by a matching component 330) based on comparing the set of descriptors to a set of reference descriptors associated with reference samples among the set of reference samples.

At 808, a filtered set of reference samples can be dynamically generated (e.g., by a first filter component 340) based on a number of hits associated with the set of hits for a reference sample among the set of reference samples and a match threshold. At 810, upon the number of hits of reference samples among the filtered set of reference samples satisfying a threshold-match criteria, a min max value can be generated (e.g., by a second filter component 350) and associated with the reference sample, wherein if the min/max value satisfies criteria relating to a window size, the reference sample is removed from the filtered set of reference samples and added to a set of potential matches.

At 812, a histogram can be generated (e.g., by a histogram component 510) for respective potential matches in the set of potential matches based on the set of hits for respective potential matches and the window size. At 814, a set of histograms can be analyzed (e.g., by a histogram component 51) to indentify a most likely matching histogram among the set of histograms. In one implementation, a fixed peak threshold can be used in comparison to peaks in the set of histograms whereby any peak meeting the peak threshold can be deemed a most likely matching histogram among the set of histograms.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 9:
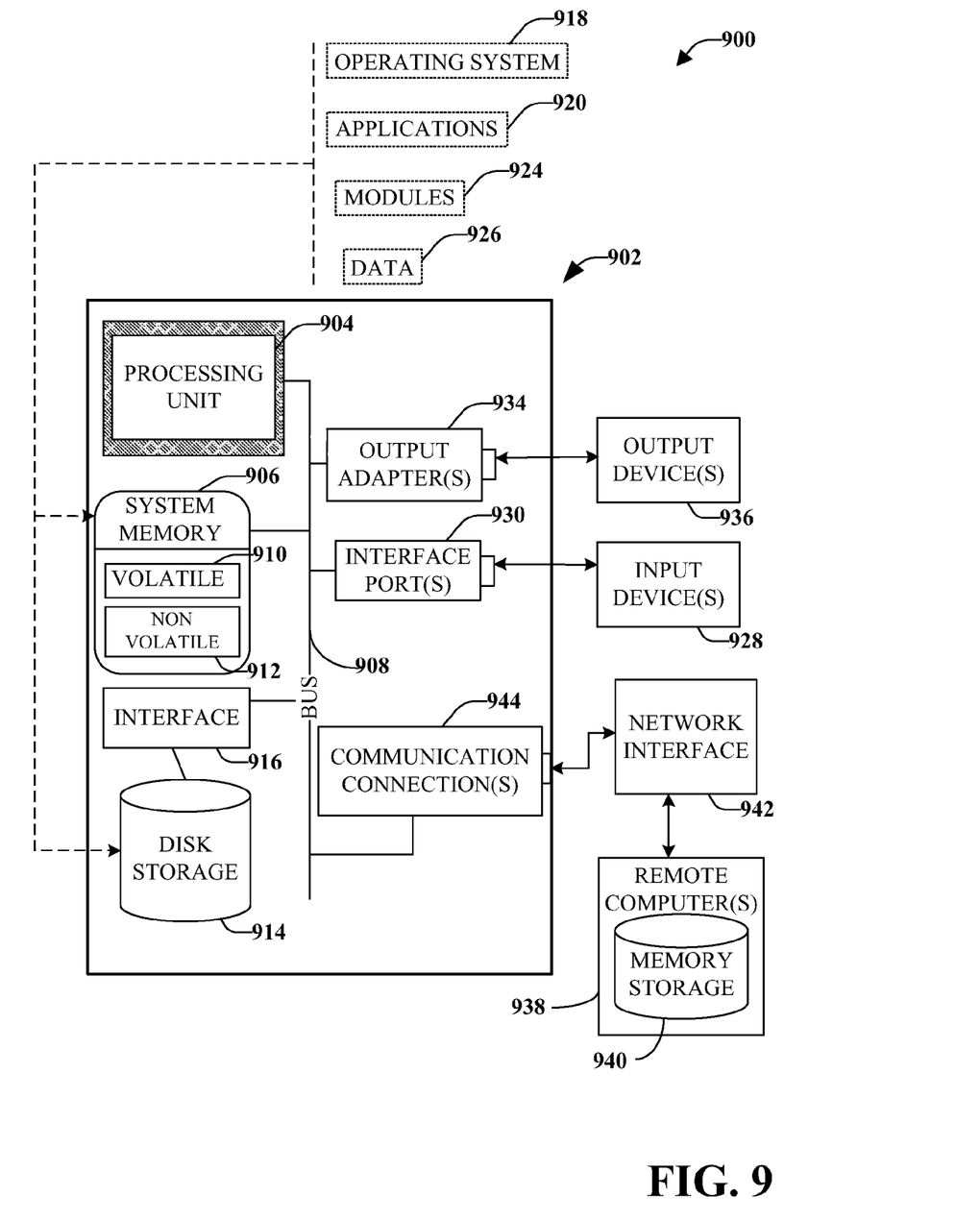
FIG. 9 illustrates an example block diagram of a computer operable to execute the disclosed architecture in accordance with implementations of this disclosure.

With reference to FIG. 9, a suitable environment 900 for implementing various aspects of the claimed subject matter includes a computer 902. It is to be appreciated that the computer, 902 can be used in connection with implementing one or more of the systems or components shown and described in connection with FIGS. 1-4. The computer 902 includes a processing unit 904, a system memory 906, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
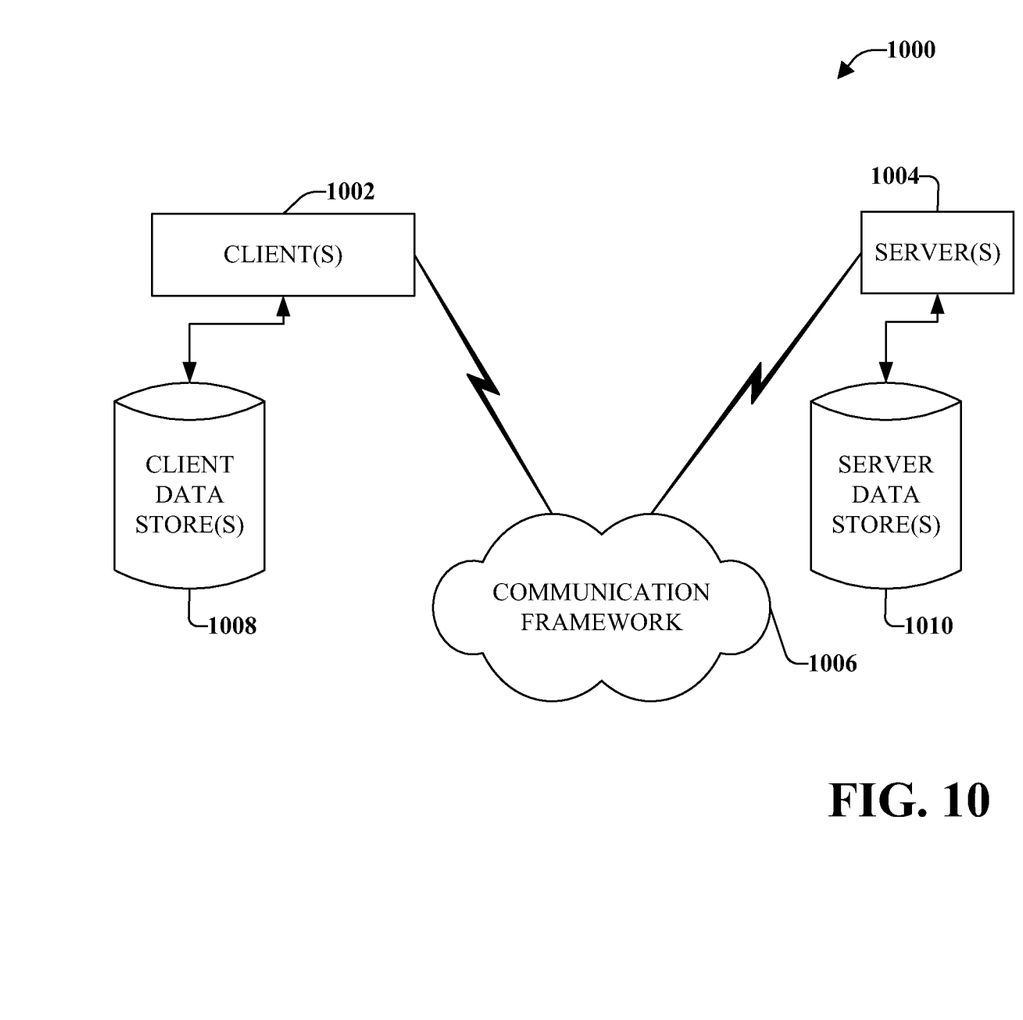
FIG. 10 illustrates an example schematic block diagram for a computing environment in accordance with implementations of this disclosure.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s), metadata, and/or associated contextual information and can also house threads to perform, for example, receiving an audio sample, generating descriptors, filtering reference samples, etc. in accordance with the subject disclosure.

The system 1000 also includes one or more server(s) 1004. The server(s) 1004 can also be hardware or hardware in combination with software (e.g., threads, processes, computing devices). The servers 1004 can house threads to perform, for example, receiving an audio sample, generating descriptors, filtering reference samples, etc. in accordance with the subject disclosure. One possible communication between a client 1002 and a server 1004 can be in the form of a data packet adapted to be transmitted between two or more computer processes where the data packet contains, for example, an audio sample or descriptors associated with an audio sample. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
   an input component that receives an audio sample;
   a descriptor component that generates a set of descriptors based on the audio sample;
   a matching component that dynamically generates respective sets of hits for respective reference samples in a set of reference samples based on comparing the set of descriptors to respective sets of reference descriptors associated with the reference samples in the set of reference samples;
   a first filter component that dynamically generates a filtered set of reference samples based on respective numbers of hits associated with the sets of hits for the reference samples in the set of reference samples and a match threshold;
   a second filter component that, for each reference sample in the filtered set of reference samples:
   in response to a number of hits of a reference sample in the filtered set of reference samples satisfying a threshold-match criteria, generates a min/max value and associates the min/max value with the reference sample, and
   in response to the min/max value satisfying criteria relating to a window size, removes the reference sample from the filtered set of reference samples and adds the reference sample to a set of potential matches; and
   a third filter component that, for each reference sample in the filtered set of reference samples, in response to the number of hits of the reference sample in the filtered set of reference samples satisfying the threshold-match criteria, dynamically associates hits in excess of the threshold-match criteria as a second set of hits for the reference sample.

2. The system of claim 1, wherein the window size is based on a length of the audio sample and a time stretch sensitivity.

3. The system of claim 1, wherein the min/max value is generated based on comparing a descriptor hit time and a reference descriptor hit time for respective hits in the set of hits.

4. The system of claim 1, wherein the third filter component further removes the reference sample from the filtered set of reference samples, and adds the reference sample to the set of potential matches based on a function of the min/max value, the second set of hits associated with the reference sample, and the criteria relating to the window size.

5. The system of claim 1, wherein the input component receives the audio sample from a client device incrementally and the descriptor component dynamically generates the set of descriptors in response to the incremental reception.

6. The system of claim 1, further comprising:
   a histogram component that generates a histogram for respective potential matches in the set of potential matches based on the set of hits for respective potential matches, and the window size.

7. The system of claim 6, wherein the histogram component further analyzes a set of histograms to identify a most likely matching histogram among the set of histograms.

8. A method comprising:
   receiving, by a system including a processor, an audio sample;
   generating, by the system, a set of descriptors based on the audio sample;
   dynamically, by the system, generating respective sets of hits for reference samples in a set of reference samples based on comparing the set of descriptors to respective sets of reference descriptors associated with the reference samples in the set of reference samples;
   dynamically, by the system, generating a filtered set of reference samples based on respective numbers of hits associated with the sets of hits for the reference samples in the set of reference samples and a match threshold; and for each reference sample in the filtered set of reference samples:
- in response to a number of hits of a reference sample in the filtered set of reference samples satisfying a threshold-match criteria, generating, by the system, a min/max value and associating the min/max value with the reference sample,
- in response to the min/max value satisfying criteria relating to a window size, removing, by the system, the reference sample from the filtered set of reference samples and adding, by the system, the reference sample to a set of potential matches,
- in response to the number of hits of the reference sample in the filtered set of reference samples satisfying the threshold-match criteria, dynamically associating, by the system, hits in excess of the threshold-match criteria as a second set of hits for the reference sample.

9. The method of claim 8, wherein the window is based on a length of the audio sample and a time stretch sensitivity.

10. The method of claim 8, wherein the generating the min/max value is further based on comparing a descriptor hit time and a reference descriptor hit time for respective hits in the set of hits.

11. The method of claim 8, further comprising, for each reference sample in the filtered set of reference samples:
removing, by the system, the reference sample from the filtered set of reference samples and adding, by the system, the reference sample to the set of potential matches based on a function of the min/max value, the second set of hits associated with the reference sample, and the criteria relating to the window size.

12. The method of claim 8, wherein the receiving the audio sample is incremental and in response to the incremental reception, the generating the set of descriptors is dynamic.

13. The method of claim 8, further comprising:
generating, by the system, a histogram for respective potential matches in the set of potential matches based on the set of hits for respective potential matches, and the window size.

14. The method of claim 13, further comprising:
analyzing, by the system, a set of histograms to identify a most likely matching histogram among the set of histograms.

15. A non-transitory computer-readable medium having instructions stored thereon that, in response to execution, cause a system including a processor to perform operations, comprising:

receiving an audio sample;
generating a set of descriptors based on the audio sample;
dynamically generating respective sets of hits for reference samples in a set of reference samples based on comparing the set of descriptors to respective sets of reference descriptors associated with the reference samples in the set of reference samples;
dynamically generating a filtered set of reference samples based on respective numbers of hits associated with the sets of hits for the reference samples in the set of reference samples and a match threshold; and
for each reference sample in the filtered set of reference samples:
- in response to a number of hits of a reference sample in the filtered set of reference samples satisfying a threshold-match criteria, generating a min/max value and associating the min/max value with the reference sample,
- in response to the min/max value satisfying criteria relating to a window size, removing the reference sample the filtered set of reference samples and adding the reference sample to a set of potential matches,
- in response to the number of hits of the reference sample in the filtered set of reference samples satisfying the threshold-match criteria, dynamically associating hits in excess of the threshold-match criteria as a second set of hits for the reference sample.

16. The non-transitory computer-readable medium of claim 15, the operations further comprising:
removing the reference sample from the filtered set of reference samples and adding the reference sample to the set of potential matches based on a function of the min/max value, the second set of hits associated with the reference sample, and the criteria relating to the window size.

17. The non-transitory computer-readable medium of claim 15, the operations further comprising:
generating a histogram for respective potential matches in the set of potential matches based on the first set of hits and the second set of hits for respective potential matches, and the window size; and
analyzing a set of histograms to identify a most likely matching histogram among the set of histograms.

\* \* \* \* \*